Patented Dec. 15, 1936

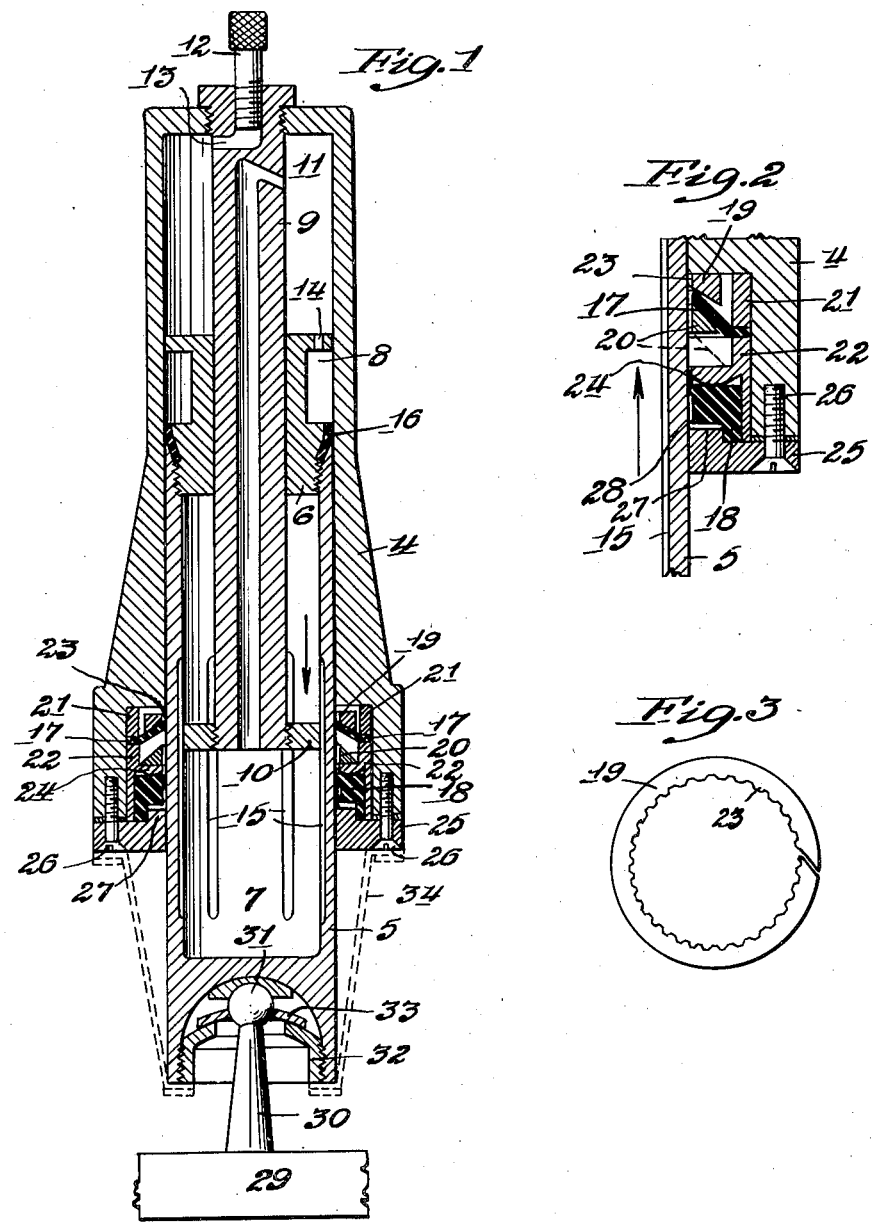

2,064,527

UNITED STATES PATENT OFFICE

2,064,527

SEALING MEANS FOR PNEUMATIC SPRINGS AND THE LIKE

Elov Ericsson, St. Paul, Minn.

Application July 13, 1934, Serial No. 734,929

5 Claims. (Cl. 286—26).

It is my object to provide novel and efficient means for retaining highly compressed air in an expansible chamber, such as that employed in pneumatic springs for motor vehicles.

A particular object is to provide improved sealing means for a pneumatic spring of the type described in my Patent No. 1,754,989, dated April 15, 1930.

Other objects will appear and be more fully pointed out in the following specification and claims.

In the accompanying drawing,

Figure 1 is a central vertical section through the cylinder and piston of a pneumatic spring embodying my invention;

Fig. 2 is an enlarged vertical section showing a fragmentary portion of the cylinder and the adjacent portion of the piston with my improved sealing means in the position assumed when the piston is moving upwardly relative to the cylinder, and Fig. 3 is a plan view of one of the rings for controlling the position of the flexible sealing ring.

In the drawing the numeral 4 indicates the cylinder which is closed at its upper end and has an elongated piston 5 projecting into its lower end. This piston is a hollow cylinder, closed at its outer and inner ends, the latter end being provided with a head 6 so that there is an air chamber 7 formed in the piston. The head 6 is formed with an annular receptacle 8 adjacent to the cylinder walls to receive a supply of oil. Extending axially in a bore in the head 6 is a conduit 9 which is fixed at its upper end in the cylinder head and provided at its lower end with a radially projecting ring 10 adapted to slidably engage the piston walls in the chamber 7. The conduit 9 communicates with the chamber 7 beneath the ring 10 and also with an air chamber 11 above the head 6. Air under pressure may be supplied to the chamber 11 through a valve 12 of suitable or common type. This valve is threaded in an axial bore in the conduit 9 which communicates by means of a passage 13 with the chamber 11. Oil for filling the receptacle 8 is supplied through the opening for the valve 12 and passes from the chamber 11 through a perforation 14 in the head 6 communicating with the receptacle 8.

Longitudinal grooves 15 are formed in the piston 5 to allow air to pass from one side of the ring 10 to the other. These grooves 15 terminate a substantial distance from the head 6 so that air is trapped and forms a cushion between the head 6 and ring 10 as the piston approaches the outward extremity of its movement.

A sealing ring 16, preferably of rubber, is located in a recess in the outer periphery of the head 6 and is held in place by engagement with a beveled upper end on the piston walls, the head having a threaded connection with the walls. The ring 16 extends obliquely upward and outward to contact upon a narrow zone with the cylindrical bore of the cylinder.

Adjacent to the piston near the lower extremity of the cylinder is an annular chamber containing flexible and compressible sealing members 17 and 18, expansible rings 19 and 20 and suitable means for retaining the sealing members and rings in an operative relation to the cylinder and piston. The inner portion of the member 17 is flexible and conical so that it normally extends obliquely into contact with the piston. Positioned above this flexible inner portion of the sealing member 17 is the ring 19 which is beveled on its lower surface to conform to the member 17 in its sealing position. The ring 19 is split, as illustrated in Fig. 3, and has a toothed or corrugated inner periphery 23 which engages the piston at a multiplicity of points spaced around its periphery. The ring is preferably made of cast iron and has a tendency to contract and grip the periphery of the piston with a light pressure. The ring 20 is similar to the ring 19, except that its upper and outer periphery is beveled or made conical to contact with the bottom surface of the sealing member 17. The rings 19 and 20 are allowed limited movement longitudinally of the cylinder and piston, being confined between the inner extremity of the annular recess in the cylinder and an annular flange 24 formed on the retaining ring 22.

The sealing member 18 is positioned between the flange 24 and a cap 25 which is secured to the lower end of the cylinder by a plurality of bolts 26. A somewhat compressible gasket is placed between the cap 25 and its seat on the bottom of the cylinder 4. The member 18 is a relatively thick ring preferably constructed from soft rubber, which is confined by an annular shoulder 27 formed on the cap 25 and has the lower portion of its periphery 28 adjacent to the piston 5 normally spaced slightly from the piston and the upper portion engaging the piston, as indicated in Fig. 2, so that this sealing member 18 contacts with the piston only at the upper extremity of its inner periphery. Limited movement of the inner periphery of the member 18 is permitted by allowing the normally open space, best shown in Fig. 2, between the top of the shoulder 27 and bottom surface of the member 18 and also between the inner periphery of the flange 24 and top surface of the member 18, the bottom surface of the flange 24 being convex and the top surface of the member 18 being a plane, horizontal surface which contacts with the flange 24 approximately midway between the outer and inner periphery of the member 18.

The cylinder 4 may be secured to the frame of a vehicle and motion of the running gear may be transmitted from a member 29 of such gear to the piston 5 through a stud 30. At the upper end of this stud there is a spherical head 31 having a suitable spherical seat in a recess in the piston 5. The head 31 is held on its seat by a screw cap 32 threaded in the piston and provided with a movable disk 33 on its upper surface to engage the under side of the head 31, as more fully described in my said Patent No. 1,754,989. A dust cover 34, indicated in dotted lines in Fig. 1 may be provided to enclose the exposed part of the outer periphery of the piston 5, said cover being secured in place in suitable or common manner.

Operation

In operation, a supply of suitable oil is placed in the receptacle 8 and air under sufficient pressure to sustain the load is delivered to the chambers 11 and 7 through the valve 12. These chambers 7 and 11 are in communication with each other through the conduit 9. When in use, a small amount of oil escapes past the ring 16 and flows down the bore between the cylinder and piston. This oil is free to pass the ring 19 but when it reaches the sealing member 17 further progress downward is largely arrested because this member securely seals the piston when the latter is moving downward relative to the cylinder, as indicated by the arrow in Fig. 1. During movement in this direction, the ring 19 is actuated downwardly to positively retain the inner periphery of the member 17 against the piston while the ring 20 is moved down out of contact with the member 17. Further, during the downward stroke of the piston, the resiliency and form of the member 18 causes it to grip the piston to minimize the escape of the oil and air.

Upon the return or upward stroke of the piston, illustrated in Fig. 2, the ring 20 is carried upward by the piston to actuate the inner periphery of the member 17 out of contact with the piston so that any oil that may have escaped below the member 17 is free to pass upward beyond the sealing members. By my arrangement of the resilient member 18 with the stricture at the upper part of the periphery 28, upward movement of oil with the piston is also permitted so that during the operation of the device there is a continuous return of any oil which passes the sealing device to the chamber within the cylinder.

The oil should be thick enough so that it will not run down the bore of the cylinder faster than the piston moves downward relative to the cylinder. Thus, as hereinbefore indicated, the oil adhering to the cylinder on its upward stroke is pressed past the ring 16 into the receptacle 8. The ring 16 is held against the cylindrical bore with more pressure from above than exists below the ring between the piston and cylinder and it is believed that this ring maintains substantially atmospheric pressure between the bore of the cylinder and piston below the ring 16. I prefer to allow the rings 19 and 20 to follow up and down with the piston as much as 1/8th of an inch so that the inner periphery of the sealing member 17 is alternately pressed firmly against the piston and then, on the reverse stroke, spaced from the piston. By my arrangement of the sealing member 18 with its stricture at the upper extremity of its inner periphery any fluid pressure exerted on this ring from above results in a firmer grip on the piston and this further guards against loss of pressure in the cylinder chamber.

Having described my invention, what I claim as new and desire to protect by Letters Patent is:

1. Sealing means for a cylinder having a piston comprising, an annular chamber formed in said cylinder adjacent to said piston, a pair of rings encircling said piston in said chamber and resiliently gripping said piston, a flexible sealing member extending between said rings and having a substantially conical inner portion adapted to engage said piston and means for confining said rings to limited movement along said piston, said rings being formed to alternately actuate said sealing member to and out of engagement with said piston during reciprocating movement of said piston in said cylinder.

2. Sealing means for a cylinder having a piston comprising, an annular chamber formed in said cylinder adjacent to said piston, a pair of rings encircling said piston in said chamber and resiliently gripping said piston, the gripping surfaces of said rings being formed to engage the piston at a multiplicity of spaced points, a flexible sealing member extending between said rings and having an obliquely disposed inner portion adapted to engage said piston and means for confining said rings to limited movement along said piston, said rings being formed to alternately actuate said sealing member to and out of engagement with said piston during reciprocating movement of said piston in said cylinder.

3. A sealing device for a vertically disposed cylinder having a piston projecting from the bottom thereof and an annular recess adjacent to said piston in said cylinder, said sealing device comprising, a flexible, conical sealing member coaxially disposed about said piston and movable to and from engagement with said piston in said recess, means engaging said piston to actuate said member to and from sealing engagement with said piston upon reciprocating movement of said piston, a relatively thick, annular and resilient sealing member having a stricture embracing said piston at the inner and upper periphery of said relatively thick member and means for confining said sealing members in said recess.

4. A sealing device for a reciprocating piston operating member comprising, a flexible washer disposed with its inner periphery normally embracing said member, said periphery being movable to a position out of contact with said member and a ring arranged to positively actuate the inner periphery of said washer to a position out of contact with said piston operating member during the stroke of said member in one direction.

5. The combination with a cylinder containing a liquid, a piston movable in said cylinder and a reciprocating piston operating member projecting from said cylinder, of a flexible sealing washer adapted to embrace said member and movable to a position out of contact therewith, a ring arranged to positively actuate said washer to a position out of contact with said member during the stroke of said member in one direction and means for actuating said member into sealing relation with said piston member during the reverse stroke of said member.

ELOV ERICSSON.